(12) United States Patent
Chen

(10) Patent No.: US 6,229,891 B1
(45) Date of Patent: May 8, 2001

(54) UNIVERSAL HANDSFREE SET SEAT

(75) Inventor: Tonny Chen, Changhua (TW)

(73) Assignee: E. Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 09/188,119

(22) Filed: Nov. 9, 1998

(Under 37 CFR 1.47)

Related U.S. Application Data

(63) Continuation-in-part of application No. 08/778,345, filed on Jan. 3, 1997, now abandoned.

(51) Int. Cl.[7] ................................................. H04M 1/00
(52) U.S. Cl. ................................. 379/446; 379/455
(58) Field of Search ........................... 379/446, 454, 379/455, 426, 438, 420; 455/90, 575

(56) References Cited

U.S. PATENT DOCUMENTS

| | | | |
|---|---|---|---|
| 5,033,709 | * | 7/1991 | Yuen ..................................... 379/454 |
| 5,212,722 | * | 5/1993 | Murata ................................. 379/420 |
| 5,305,381 | * | 4/1994 | Wang et al. ......................... 379/454 |

* cited by examiner

Primary Examiner—Jack Chiang
(74) Attorney, Agent, or Firm—Bacon & Thomas, PLLC

(57) ABSTRACT

A universal handsfree set seat on which various types of mobile phones can be placed. The dimension of the rest section of the handsfree set seat is adjustable according to the volume of the mobile phone. The universal handsfree set seat includes a seat body, a clamping mechanism and a twin-head connecting plug for receiving and connecting with various telecommunication peripheral equipment.

2 Claims, 7 Drawing Sheets

UNIVERSAL HANDSFREE SET SEAT

This application is a continuation-in-part of U.S. patent application Ser. No. 08/778,345, filed Jan. 3, 1997, abandoned.

BACKGROUND OF THE INVENTION

The present invention relates to a universal handsfree set seat on which various types of mobile phones can be placed. The dimension of the rest section of the handsfree set seat is adjustable according to the volume of the mobile phone. The handsfree set seat is able to receive and connect with various telecommunication peripheral equipment to enhance the usability of the mobile phone.

Various kinds of mobile phones have been more and more widely used. It is required nowadays that the mobile phone should have expanded functions and thus more and more related peripheral equipment have been developed, especially with respect to the handsfree set seats for mobile phones used in cars. Some shortcomings exist in such devices, as follows:

Referring to FIG. 1, because the profile, dimension and signal connecting socket of the mobile phone are varied with the types thereof, the car-used handsfree set seat for the mobile phone is made with various patterns according to the type of the mobile phone, for snugly fitting the mobile phone thereon. This increases the manufacturing cost of manufacturers and leads to storage load of distributors.

SUMMARY OF THE INVENTION

It is therefore a primary object of the present invention to provide a universal handsfree set seat in which the dimension of the rest section of the handsfree set seat is adjustable according to the type and dimension of the mobile phone.

It is a further object of the present invention to provide the above universal handsfree set seat to which functions of peripheral equipment can be added (such as a handsfree hand set and charging). Any type of mobile phone can be connected with the handsfree set seat.

The present invention can be best understood through the following description and accompanying drawings, wherein:

DETAILED DESCRIPTION OF THE PREFERRED EMBODIMENT

Figure 1:
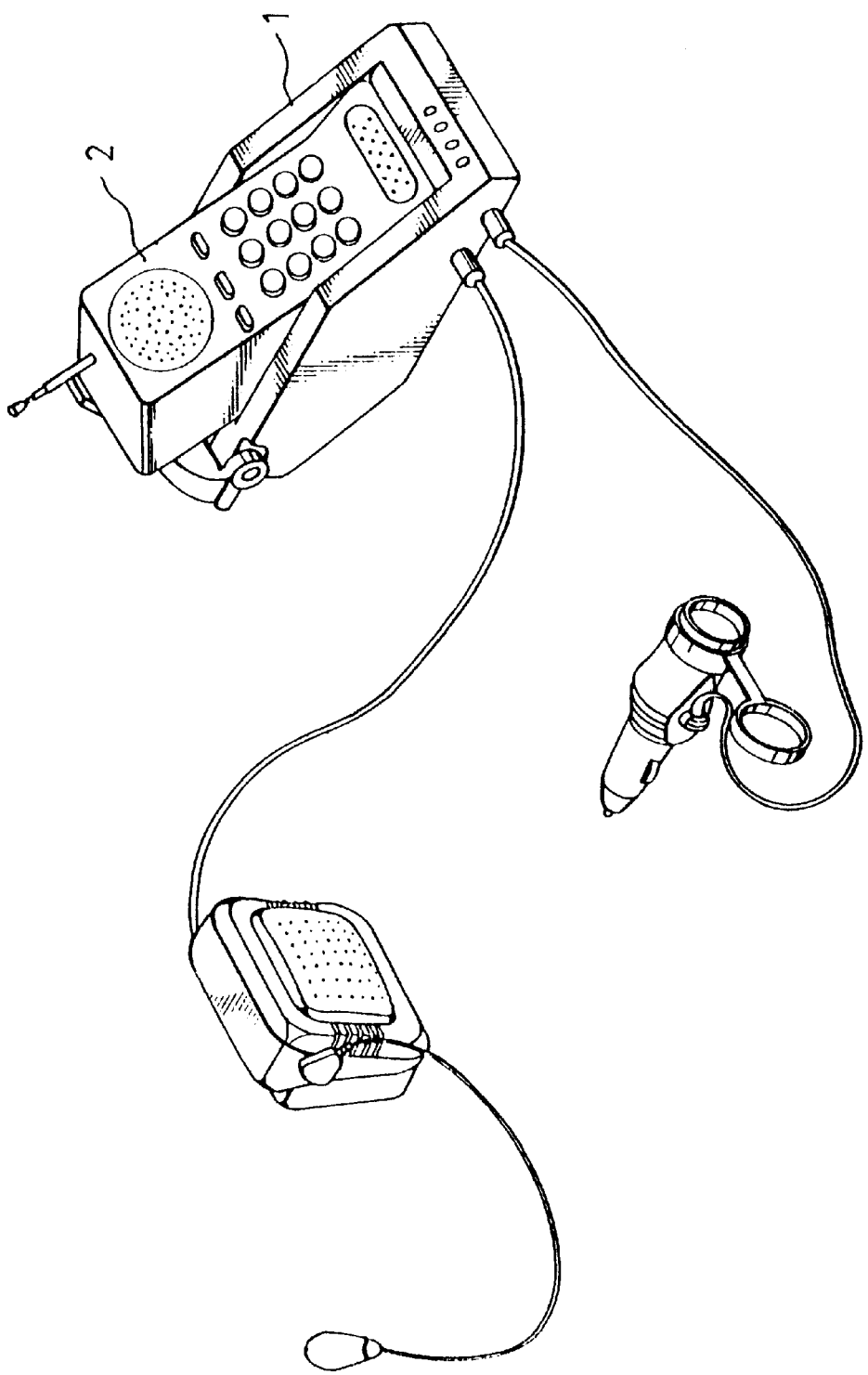
FIG. 1 is a perspective view of a conventional handsfree set seat for a mobile phone.
Figure 2:
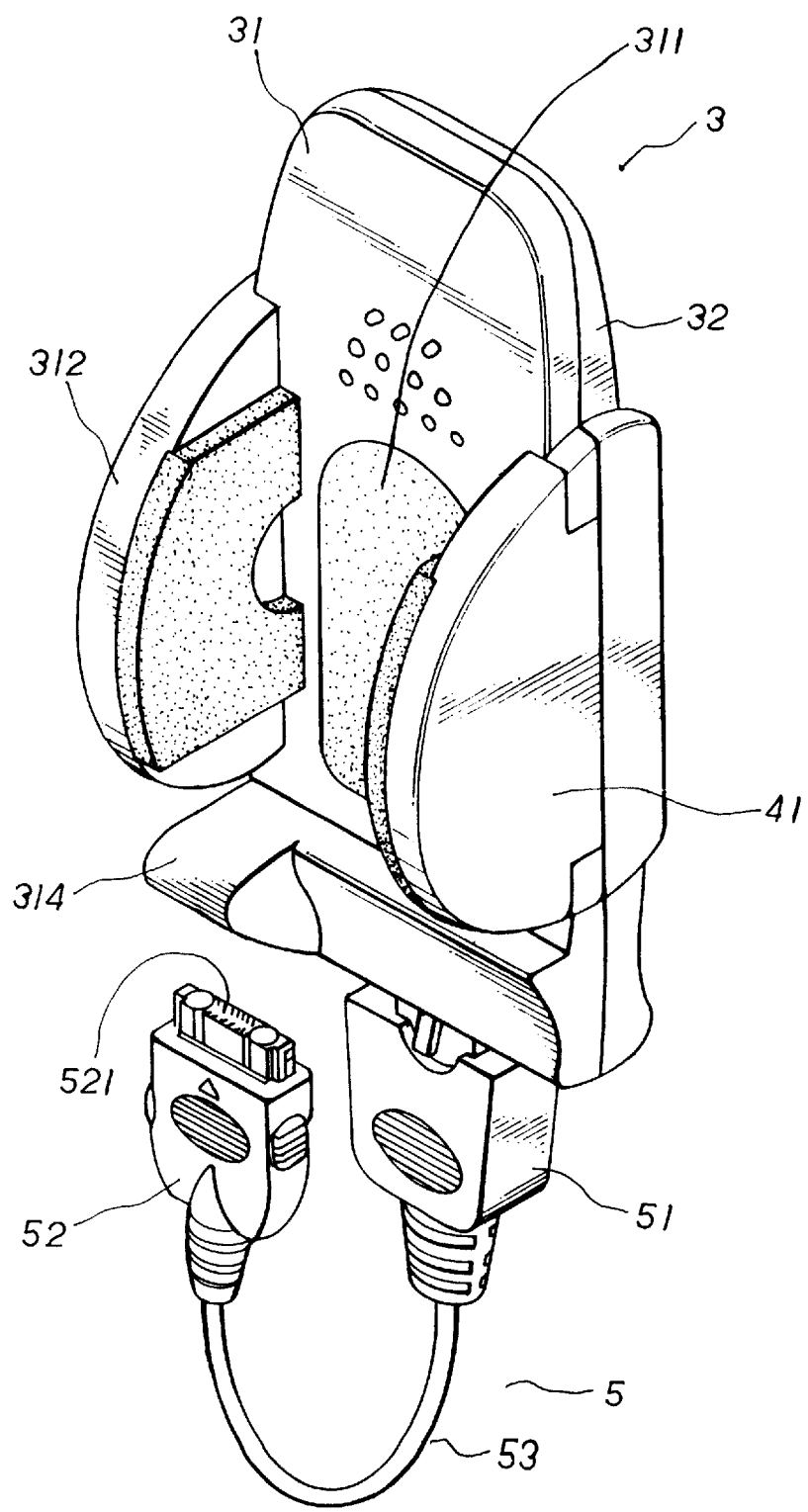
FIG. 2 is a perspective assembled view of the universal handsfree set seat of the present invention.
Figure 3:
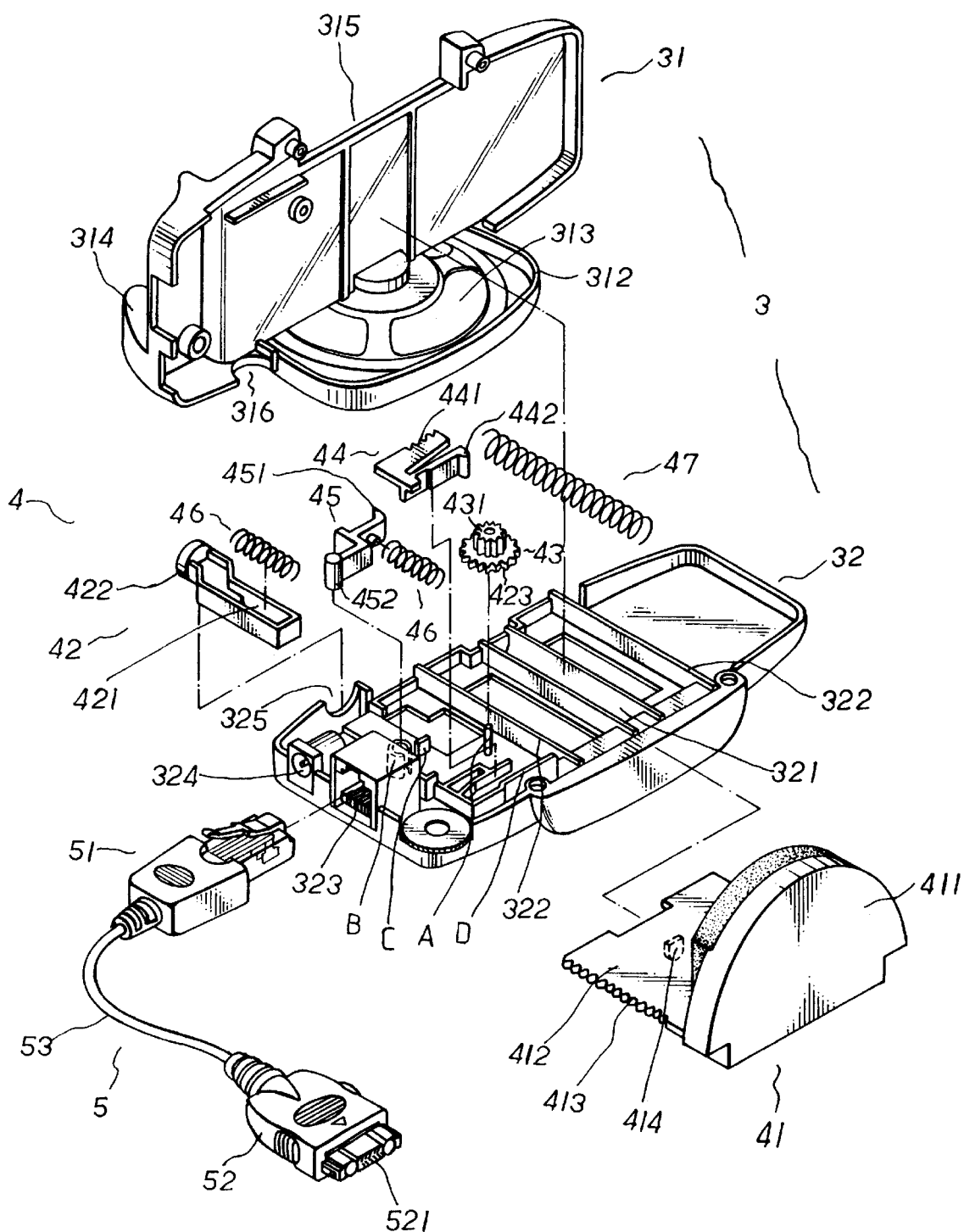
FIG. 3 is a perspective exploded view of the universal handsfree set seat of the present invention.

Please refer to FIGS. 2 and 3. The present invention mainly includes a seat body 3, a clamping mechanism 4 and a twin-head connecting plug 5.

The seat body 3 is composed of upper and lower seat members 31, 32. The upper seat member 31 includes a rest section 311 for placing a mobile phone 2 thereon. Stopper arms 312, 314 are respectively disposed on a lateral side and a bottom side of the rest section. A speaker 313 and a microphone 330 are received in the respective stopper arms. The opposite side of the stopper arm 312 is formed with a slot 315. The lateral edge of the upper seat member 31 is disposed with a semicircular hole 316 and the lateral edge of the lower seat member 32 is formed with a semicircular hole 325 mating therewith to form a circular hole for receiving a protruding depression button 42 of the clamping mechanism 4. The lower seat member 32 is mated with the upper seat member 31 and includes guide channel 321 and guide rail 322 to permit sliding movement of the L-shaped stopper board 41 of the clamping mechanism 4. The bottom side of the lower seat member 32 includes an insertion hole 323 and a terminal insertion socket 324 including a level circuit (not shown) selected according to the types of phones to be plugged therein. In addition, the lower seat member includes several locating pins A, C, locating holes B and engaging plates D. Other telecommunication peripheral equipment (not shown) can be installed in the seat body 3.

The clamping mechanism 4 includes an L-shaped stopper board 41, a long spring 47, a double-layer gear 43, a restricting plate 44, an engaging hook 45, two springs 46 and a depression button 42 contained in the interior between the upper and lower seat members 31, 32. One side of the L-shaped stopper board 41 extends outside the seat body 3. The L-shaped stopper board 41 includes a plate body 412 formed with a rack 413 on lateral side and an upward extending stopper plate 411. The plate body 412 is received between the lower and upper seat members. The plate body 412 is formed with a pushing block 414 fitted in the guide channel 321 of the lower seat member 32 for pushing the long spring 47. The double-layer gear 43 is formed by two gears 431, 432 with different diameters and overlying each other. The gear is fitted around the locating pin A of the lower seat member 32. The upper gear 431 is engaged with the rack 413 of the L-shaped stopper board 41 and the rack 441 of the restricting plate 44. The lower gear 432 is engaged with a hook body 451 of the engaging hook 45 and restricted thereby. One end 452 of the engaging hook 45 is inserted into the locating hole B of the lower seat member 32 and is swung by the depression button 42 to push the restricting plate 44. The hook body 451 of the engaging hook 45 is engaged with the lower gear 432 of the double-layer gear 43. A spring 46 is disposed on the rear side of the engaging hook 45 for normally keeping the hook in an engaged state. The depression button 42 has a hollow rear section 421 for fitting the locating pin C of the lower seat member therein. Spring 461 is received in the hollow portion with one end abutting against the locating pin C and the other end pushing the inner edge of the hollow portion 421 of the depression button 42. The depression button 422 of the depression button 42 protrudes outside the circular hole formed by the semicircular holes 316, 325 of the seat body. The restricting plate 44 is disposed with a rack 441 on one side and engaged with the upper gear 431 of the double-layer gear 43. The other side is disposed with an extending resilient plate 442 abutting against the engaging plate D of the lower seat member 32.

The twin-head connecting plug 5 includes a mobile phone plug 52 at one end for inserting into the socket 21 of the mobile phone. The front end of the plug 52 includes a lead 521 corresponding to the mobile phone socket 21. The other end of the twin-head connecting plug 5 is disposed with a holdfree hand set seat plug 51 for inserting into the socket 323 of the handsfree set seat. The two plugs 51, 52 are connected with each other by wire 53.

Figure 4:
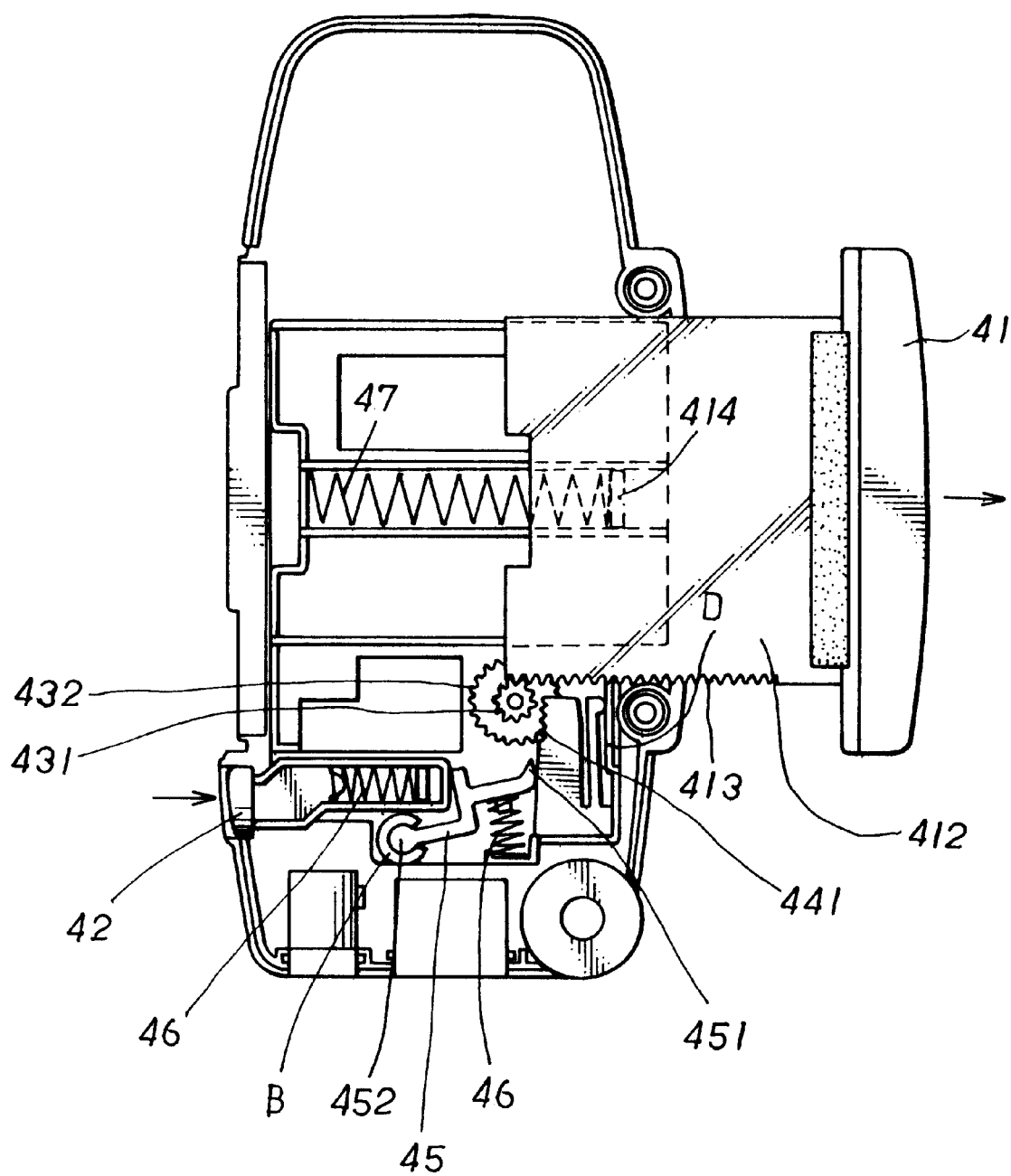
FIG. 4 is a sectional view of the universal handsfree set seat of the present invention, showing the adjustment thereof in one state.
Figure 5:
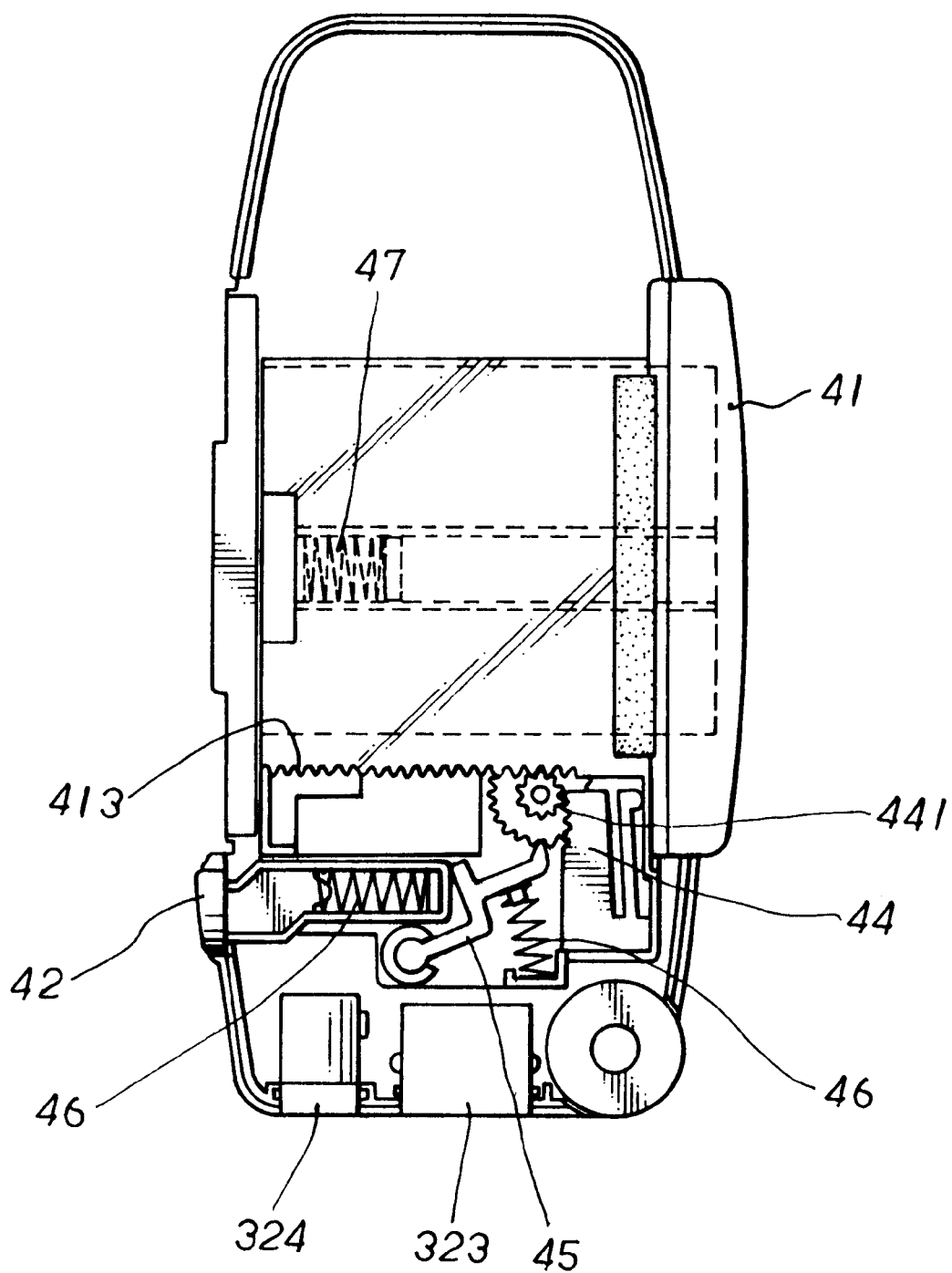
FIG. 5 is a sectional view of the universal handsfree set seat of the present invention, showing the adjustment thereof in another state.

According to the above arrangement, when placing the mobile phone (referring to FIGS. 4 and 5), the depression button 42 is depressed to compress the spring 46 and push the engaging hook 45 and restricting plate 44, making the hook body 451 of the engaging hook 45 and the rack 441 of the restricting plate 44 retract and disengage from the double-layer gear 43. The double-layer 43 thus no longer stops the L-shaped stopper board 41, permitting the same to be outward pushed by the long spring 47. At this time, the rest section 311 of the handsfree set seat is enlarged for placing the mobile phone thereon. Also, the L-shaped stopper board 41 is inwardly pushed. At this time, the pushing block 414 of the plate body 412 compresses the long spring 47 and the rack 413 of the plate body 412 is engaged with the upper gear 531 of the double-layer gear 53 and the engaging hook 45 and restricting plate 44 are respectively engaged with the upper and lower gears 431, 432 of the double-layer gear 54, preventing the long spring 47 from moving. However, when the L-shaped stopper board 41 is inwardly pushed counterclockwisely without obstacle, the stopper board is able to be smoothly inwardly pushed to fixedly clamp the mobile phone 2 on the handsfree set seat 3.

Figure 6:
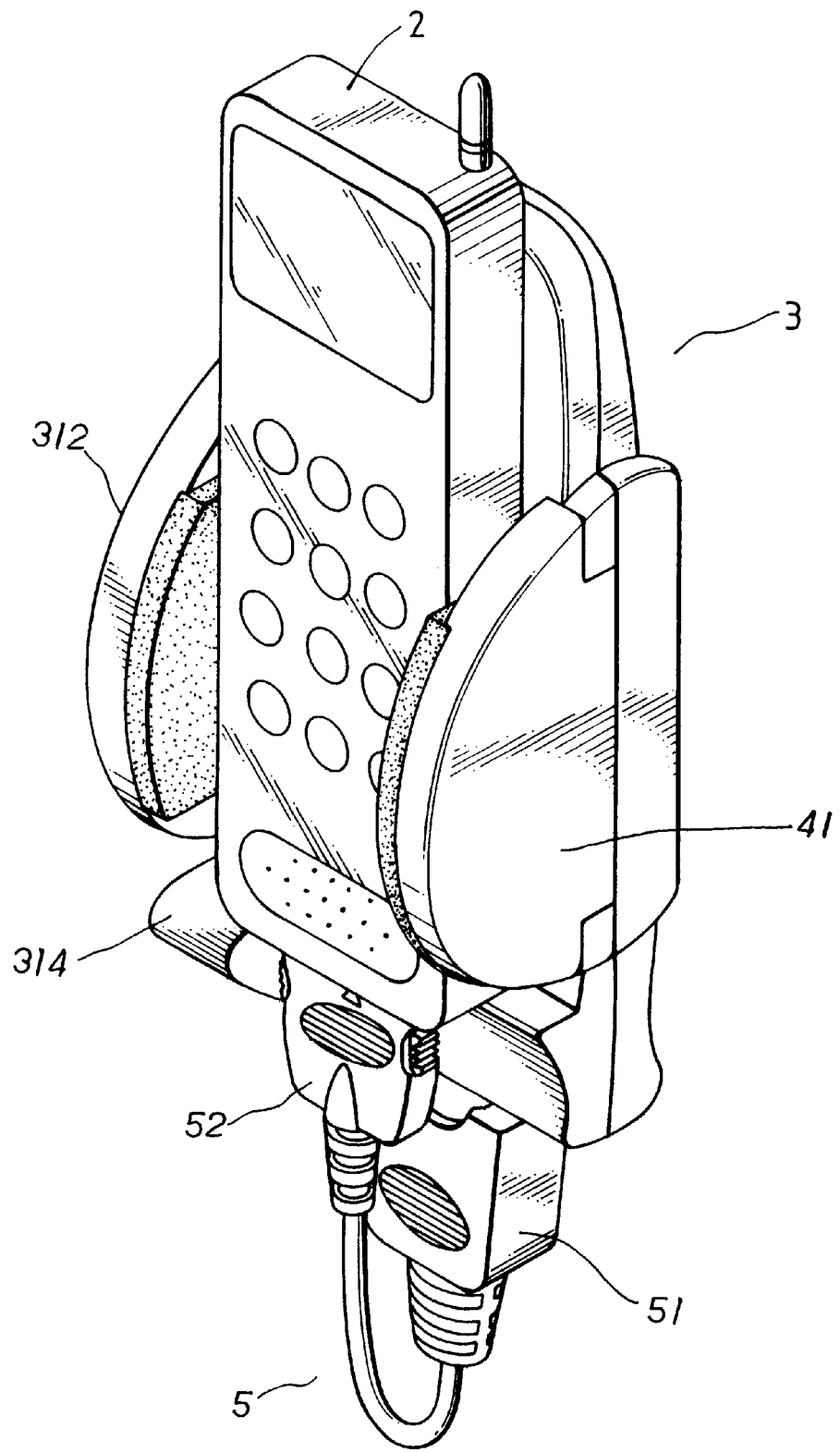
FIG. 6 is a perspective view of the universal handsfree set seat of the present invention, showing the operation of the twin-head connecting plug.
Figure 7:
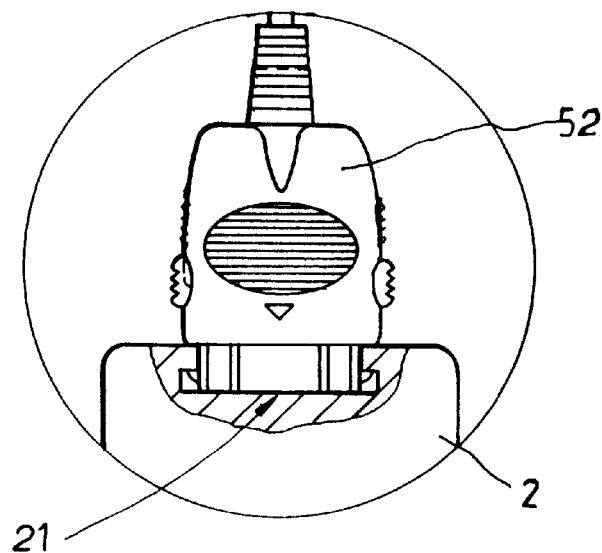
FIG. 7 is a partially sectional view of the twin-head connecting plug which is inserted into the socket of the mobile phone.
Figure 8:
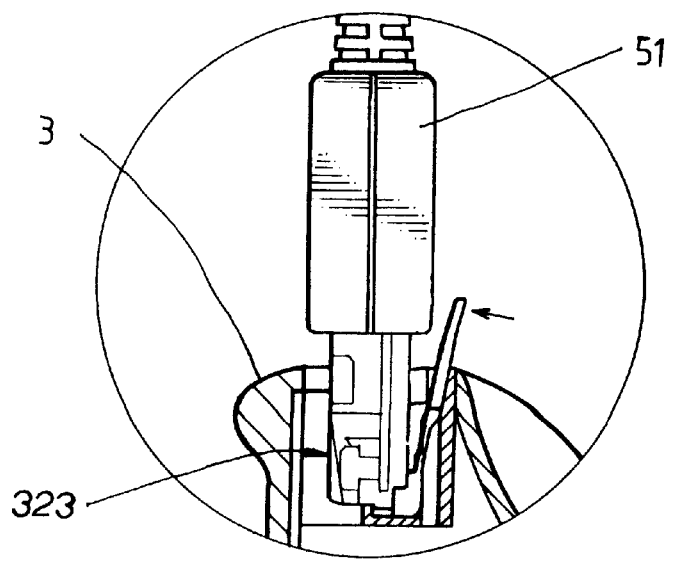
FIG. 8 is a partially sectional view of the twin-head connecting plug which is inserted into the socket of the handsfree set seat.

Referring to FIGS. 6, 7 and 8, when used in cooperation with other peripheral equipment, the mobile phone plug 52 of the twin-head connecting plug 5 is inserted into the socket 21 of the mobile phone 2, while the handsfree set seat plug 51 is inserted into the socket 323 of the handsfree set seat to complete the connection between the mobile phone 2 and the handsfree set seat 3. The mobile phone plug 52 of the twin-head connecting plug S can be made with various specifications for different models. A user can select the twin-head connecting plug according to the model of the mobile phone, whereby one single handsfree set seat 3 is universally applicable to all types of mobile phones.

The above embodiment is only an example of the present invention and the scope of the present invention should not be limited to the example. Any modification or variation derived from the example should fall within the scope of the present invention.

What is claimed is:

1. A universal handsfree set seat comprising a seat body, a clamping mechanism and a twin-head connecting plug, wherein the seat body is composed of an upper seat member and a lower seat member, the upper seat member being disposed with a rest section for placing a mobile phone thereon, a lateral stopper arm being disposed on a lateral side of said rest section and a bottom stopper arm being disposed on a bottom side of said rest section, and the lower seat member being mated with the upper seat member,;

wherein the clamping mechanism is disposed in the seat body and includes an L-shaped stopper board which can be shifted to adjust the width of the rest section to clamp different types of mobile phones, said bottom stopper arm, said lateral stopper arm, and said L-shaped stopper board being arranged such that when a mobile phone is positioned against said lateral stopper arm and said bottom stopper arm, said L-shaped stopper board is moved against a side of said mobile phone to clamp said mobile phone between said lateral stopper arm and a first arm of said L-shaped stopper board, a second arm of said L-shaped stopper board extending between said upper seat body and said lower seat body and a bottom of said mobile phone resting against said bottom stopper arm, and a terminal socket being disposed on a bottom side of the lower seat member, and wherein a speaker is received in said lateral stopper arm and a microphone is received in said bottom stopper arm, whereby the twin-head connecting plug can be replaced in order to connect different types of mobile phones with the handsfree set seat to connect said speaker and said microphone with said mobile phone.

2. A handsfree set seat as claimed in claim 1, wherein the twin-head connecting plug includes a mobile phone plug at one end for insertion into sockets of various types of mobile phones, the other end of the twin-head connecting plug including a handsfree set seat plug for insertion into the socket of the handsfree set seat.

* * * * *